United States Patent [19]

Winker et al.

[11] Patent Number: 4,651,956
[45] Date of Patent: Mar. 24, 1987

[54] DEFLATION AND CONTROL SYSTEM FOR HOT AIR BALLOONS

[75] Inventors: James A. Winker; Patrick J. Cannon; Mark L. West; Richard A. Andrews, all of Sioux Falls, S. Dak.

[73] Assignee: Raven Industries, Inc., Sioux Falls, S. Dak.

[21] Appl. No.: 819,620

[22] Filed: Jan. 17, 1986

[51] Int. Cl.⁴ .............................................. B64B 1/62
[52] U.S. Cl. ...................................... 244/99; 244/152
[58] Field of Search ................... 244/31, 96, 97, 98, 244/99, 145, 152; 251/228, 298

[56] References Cited

U.S. PATENT DOCUMENTS

| | | | |
|---|---|---|---|
| 2,399,379 | 4/1946 | Pence | 244/152 |
| 2,404,659 | 7/1946 | Rohulick | 244/145 |
| 2,644,656 | 7/1953 | Zbock et al. | 244/152 |
| 3,131,889 | 5/1964 | Yost | 244/31 |
| 3,229,932 | 1/1966 | Yost | 244/31 |
| 3,860,201 | 1/1975 | Hall | 244/99 |

Primary Examiner—Trygve M. Blix
Assistant Examiner—Jesûs D. Sotelo
Attorney, Agent, or Firm—Hill, Van Santen, Steadman & Simpson

[57] ABSTRACT

There is disclosed herein a hot air type balloon which includes a balloon envelope having a generally circular top opening and a top cap adjacent the top opening for opening and closing the balloon. The top cap forms both a deflation panel and maneuvering port for the balloon. A closure assembly is provided for use with the envelope and top cap for closing the deflation port and for permitting controlled opening thereof. The assembly has a fixed member secured to the balloon envelope and a releasable member releasably secured to the fixed member. A securement cord is secured to the releasable member and is connected to the top cap and a release line extends from the releasable member to a gondola where the operator is riding. The operator by pulling on the release line can open the closure assembly by separating the releasable member from the fixed member and can cause the deflation panel to separate from the envelope so as to spill air from the balloon and rapidly deflate the balloon.

11 Claims, 8 Drawing Figures

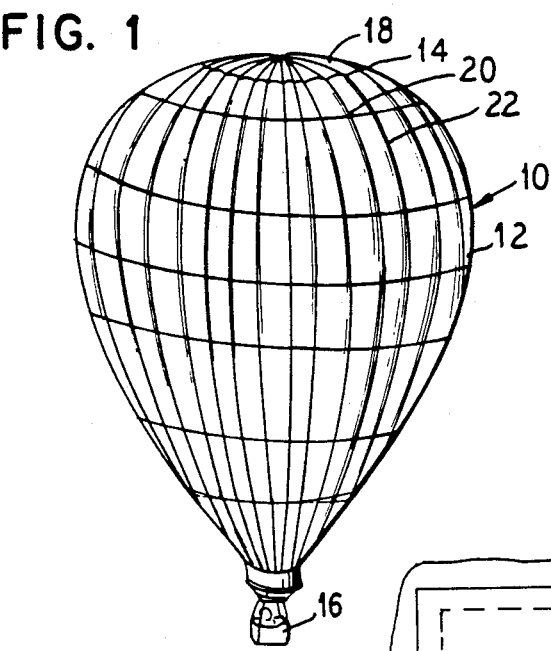
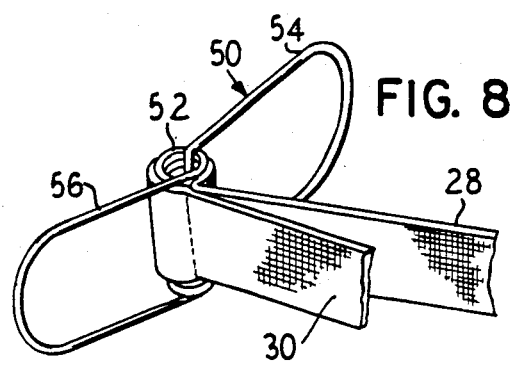
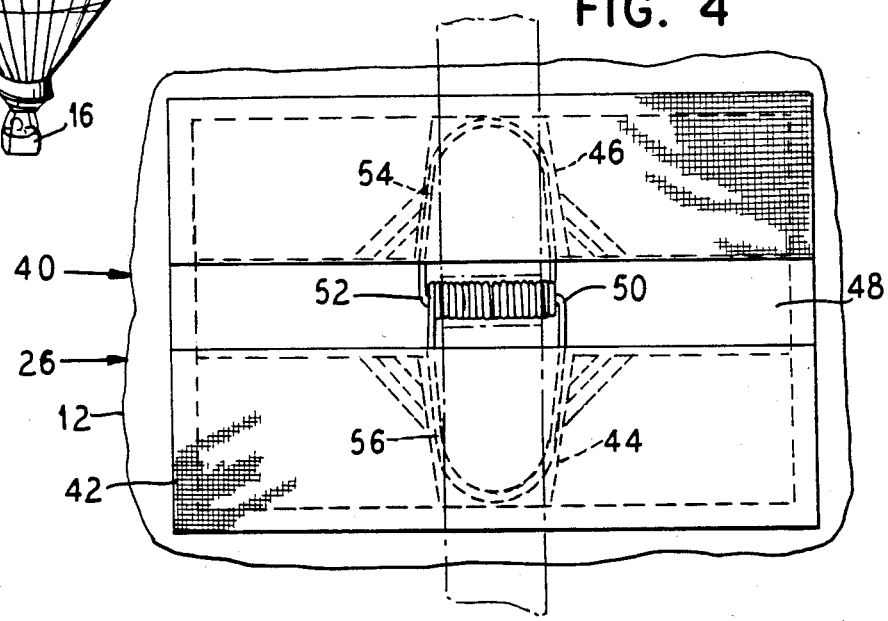
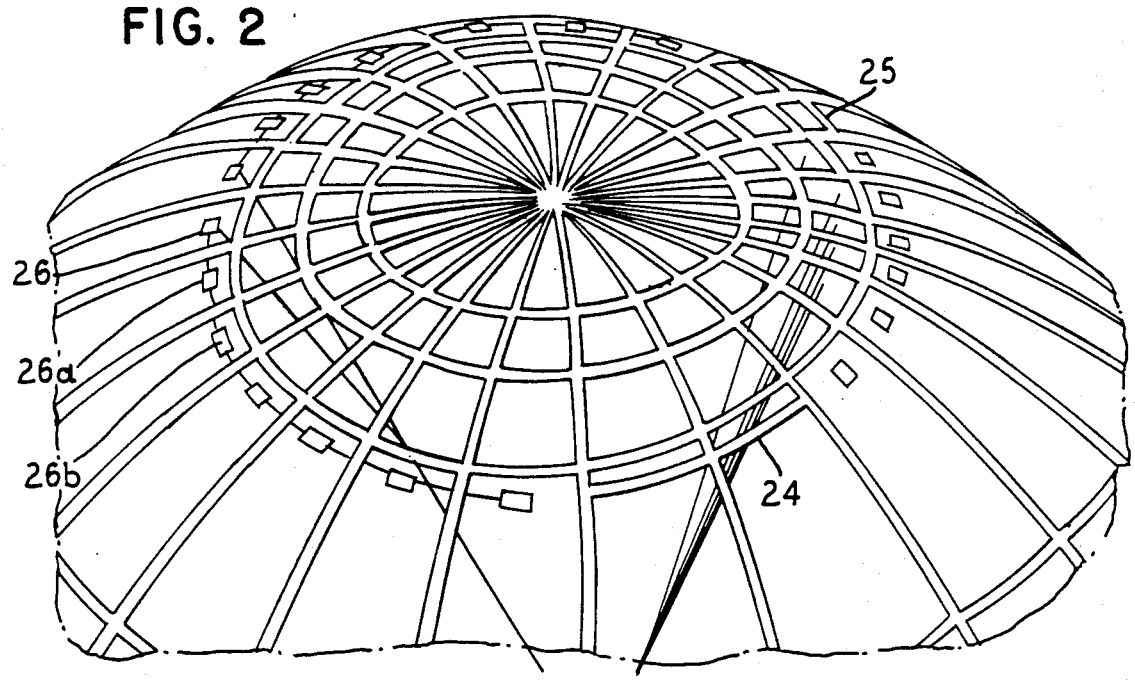

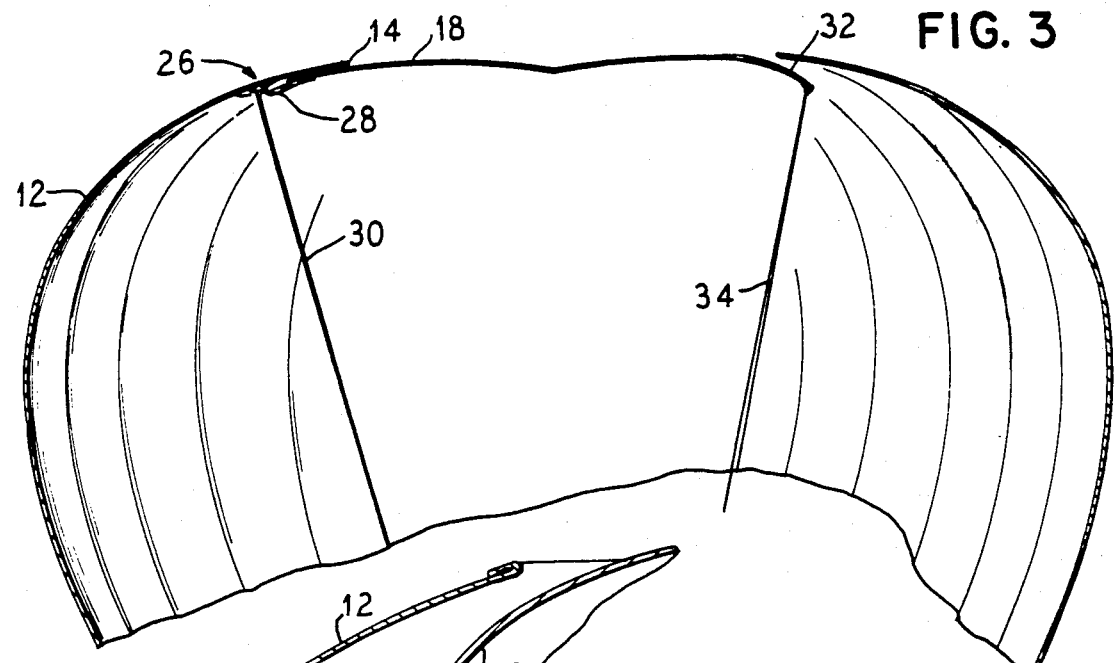
FIG. 3
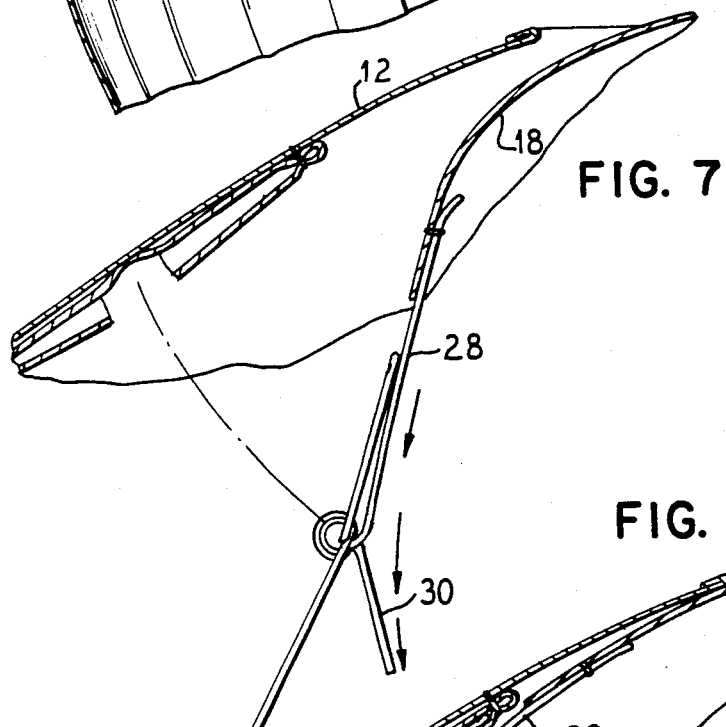
FIG. 7
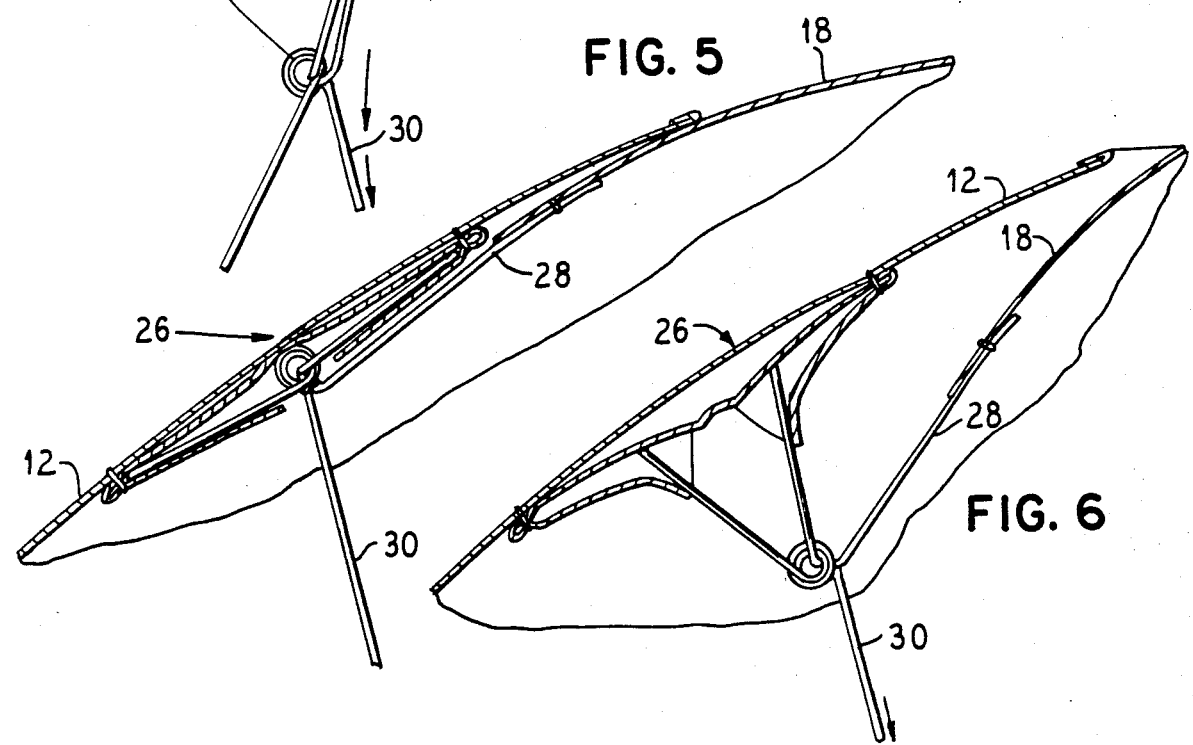
FIG. 5
FIG. 6

DEFLATION AND CONTROL SYSTEM FOR HOT AIR BALLOONS

BACKGROUND OF THE INVENTION

This invention relates to sport hot air balloons, and more particularly, to a deflation panel and maneuvering vent for the balloon and to a closure for closing and controlling the opening of the deflation panel.

Hot air balloons generally include a balloon envelope having a circular top opening, a gondola suspended from the bottom of the envelope, and a top cap for closing the top opening. During normal flight, the top opening is closed, but it is opened at the end of the flight to rapidly deflate the balloon. The deflation portion of the opening is sometimes referred to as the "deflation panel". The device to close the opening must be exceedingly reliable so as to only release air when desired. Furthermore, the device should be easy to use, easy to reinstall, require relatively little maintenance and be fail-safe if possible. Most balloons also include a second opening, called a maneuvering vent, to release controlled amounts of hot air to effect the vertical speed of the balloon. These vents, which may be opened and closed many times in flight, must also be easy to operate, allow quick reaction and be fail-safe.

In one of the earliest deflation panel designs, the top of the balloon was extended into a chimney-like structure. In normal operation, a large cylinder of material was gathered together and secured with a cord to hold the chimney closed and retain the air. To release the air the cord is released allowing the chimney to open, thereby emptying the balloon. This system is fairly secure in keeping the balloon closed but is far less reliable in opening upon command and was not considered to be fail-safe.

At present, the most widely used deflation panel is referred to as the "circular rip" in which a large circular panel is secured to a similarly sized opening in the top of the balloon. The panel is fastened to the balloon with a hook and loop fastener such as Velcro. This system is highly reliable in retaining and releasing air when desired. Its largest drawback is the time-consuming reinstallation process and a maintenance requirement which is more expensive than others.

The second most common deflation panel is known as a parachute top which is a circular panel filling a circular orifice in the balloon. The panel is not attached directly to the balloon but is retained in place by radial cords which extend from the panel to anchor points on the balloon envelope's surface. This serves not only as a deflation panel but also as a valve to release controlled amounts of air for maneuvering purposes. The parachute top is reliable in retaining air but is deficient in its ability to release air when needed. Furthermore, installation is easy but dimensional changes such as shrinkage can alter the fit resulting in leakage, which then necessitates maintenance. Furthermore, the combination of deflation and maneuvering is an advantage but is also a problem in that separation of those two functions is necessary to allow for redundancy of control as a safety factor. Reference is made to U.S. Pat. No. 2,404,659, dated July 23, 1946, which discloses a parachute-style top; U.S. Pat. No. 3,131,889 that discloses a deflation mechanism; and U.S. Pat. No. 3,229,932, which discloses a maneuvering port.

It is an object of this invention to provide a closure system for use in a sport hot air balloon which avoids the problems of the prior art.

Another object of this invention is to provide a closure system which is highly reliable and does not require time-consuming reinstallation or high maintenance.

It is another object of this invention to provide a system which provides for both deflation and maneuvering, in which these functions are separate and which allows for redundancy between the two functions.

These and other objects of this invention will become apparent from the following description and appended claims.

SUMMARY OF THE INVENTION

There is disclosed herein a balloon system which includes a balloon envelope having a circular opening at the top thereof and a top cap positioned within the envelope adjacent the top opening. A portion of the top cap defines a deflation panel and is secured to the balloon envelope by a plurality of closure asemblies. Another portion of the top cap cooperates with the balloon envelope in such a manner as to provide a venting or maneuvering port.

Each closure assembly includes a fixed member secured to the envelope interior and a releasable member which is releasably secured to the fixed member and adapted to separate therefrom. Securement means connect the top cap to the releasable member, and operator release means are secured to the releasable member for separating the releasable member from the fixed member. By separating the releasable member from the fixed member, the operator can then open the deflation panel so as to rapidly deflate the balloon. The closure member is sewn to the interior of the balloon envelope and includes a pair of pockets. The release member, sometimes referred to as a spring tab, includes a pair of wing members, each adapted to fit within a pocket. In normal operation each of the wing members are restrained in a pocket and the top cap held in position. The operator by operating the release means can pull the wing members from the pockets and then open the deflation panel. After deflation and landing, the release member is readily reinstalled in the pockets of the fixed member, is convenient to use, and requires relatively little maintenance.

The venting portion is operated by the operator pulling on a maneuvering cord that opens the vent.

The provision of both a venting port and a deflation panel in the top cap provides for the desired redundancy of operation.

BRIEF DESCRIPTION OF THE DRAWINGS

FIG. 1 is a perspective view of a hot air type balloon;

FIG. 2 is a perspective view showing the top of a hot air balloon and the positioning of various closure members around the top opening thereof;

FIG. 3 is a fragmentary vertical sectional view showing the balloon opening, top opening and top cap;

FIG. 4 is a plan view showing the closure member;

FIG. 5 is a sectional view showing the closure with the top cap held closed;

FIG. 6 is a sectional view showing the closure member with the releasable member being withdrawn from the fixed portion for opening the deflation panel;

FIG. 7 is a sectional view showing the releasable member fully withdrawn from the fixed member of the closure and the deflation panel fully opened; and FIG. 8 is a perspective view of the releasable or spring tab member.

DESCRIPTION OF THE PREFERRED EMBODIMENT

Referring now to the drawings, a hot air type sport balloon is shown in FIG. 1 as 10 generally. The balloon 10 includes a balloon envelope 12 having a circular top opening 14 and a gondola 16 suspended from the bottom of the balloon envelope. A top cap 18 is positioned inside the envelope 12, and when the balloon is inflated, the cap presses upwardly against the edges of the balloon adjacent the top opening 14 and against longitudinal restraining cords, such as 20 and 22, which are joined at the center of the top opening 14. In other words, the balloon body or envelope 12 and restraining cords, such as 20 and 22, cooperate to hold the top cap in position against the envelope. The top cap is also sewn in at least two positions, such as 24 and 25, (see FIG. 2) to the balloon envelope. These positions are approximately 120° apart and the top cap 18 overlaps the edges of the balloon envelope opening 14 for about twelve inches.

The top cap 14 provides a deflation panel for rapidly deflating the balloon and a venting port for maneuvering the balloon. The deflation panel of the top cap extends between the two sewn lines 24 and 25 for about 210° around the balloon top opening, and the venting port extends between the sewn lines 24 and 25 for approximately 90°. The attachments at 24 and 25 account for the remainder of the cap circumference.

In order to be certain that the deflation panel of the top cap is fixed in place during normal flight and can be easily opened for rapid deflation of the envelope, a plurality of closure assemblies such as 26 are sewn to the interior of the balloon envelope. A securement cord 28 extends from the closure assembly 26 to the top cap 18 and an operator release or cord 30 extends from the closure member to the gondola 16 where the operator is riding. The operator by pulling the line 30 can open the closure, and thus pull on the securement cord 28. By pulling on the release cord 30, and thus securement cord 28, the operator can cause the top cap 18 to separate from the balloon envelope 12 so as to permit air therein to spill out and rapidly deflate the envelope.

Referring now to FIG. 2, it is seen that closures such as 26 are arranged in two equal sets of seven closures about the deflation panel of the top cap. Each set extends around about 120° of the top opening. The closures in each set are serially interconnected. Thus by opening closure 26, the next closure 26a can be opened, and thereafter, closure 26b, etc., until all closures are opened. In other words, all of the closures are not opened at one time, but only the first closure in each set, and thereafter, the remaining closures serially. The serial opening reduces the forces required for opening and provides for more control of the deflation panel.

The vent or maneuvering port 32 extends between the sewn lines, such as 24, through an arc of approximately 120°.

In order to open the vent portion 32, it is only necessary to pull on the vent line 34, which pulls the entire periphery of the top cap along the vent's 120° arc away from the balloon envelope 12, thus permitting controlled venting of the balloon envelope. The extent to which the vent is opened is controlled by operator manipulation of the vent opening line 34.

A certain level of redundancy is provided by the the deflation panel and the venting port, whereby the venting port can be used for deflation and the deflation panel can be used for venting purposes.

Referring now to FIG. 4, a closure system 40 generally is shown. The system includes a fixed pocket defining member 42 which is made of a heavy fabric material which is sewn to the interior of the balloon envelope 12. The fixed member 42 defines a pair of spaced spring tab-receiving pockets, such as 44 and 46, which open toward one another and are spaced apart by a central spacer section 48. A spring tab member 50 formed of wire provides the releasable member for the closure. The spring tab member includes a center torsion spring 52 and a pair of outwardly extending U-shaped wing-like members 54 and 56. The wing-like members 54 and 56 are sized and shaped to fit snugly within the pockets 46 and 44, respectively. The torsion member 52 is positioned in the central spacer section 48.

As seen in FIGS. 5 and 8, the securement band or cord 28 surrounds and is secured at one end to the torsion spring 52 and is secured at the other end to the top cap 18. The operator release band or cord 30 is secured to the spring 52 and extends downwardly to the gondola for use by the operator. The same web of material can be used to provide the securement band 28 and operator release 30, and as seen in FIG. 8, the band is fitted around the torsion spring and is sewn together.

The closure member 40 generally is positioned on the balloon interior adjacent the top so that the securement band 28 applies a substantially lateral force to the release member when the balloon is filled. Thus the force applied by the securement band 28 tends to keep the release member, and particularly the wing members, such as 54, in the pocket 46 so as to prevent separation of the spring tab member from the fixed member. This is best seen in FIGS. 3 and 5.

When the release 30 is pulled by the operator, the applied force is substantially normal or at right angles to the closure and spring tab member 50 generally. This is seen in FIG. 6. The applied force causes the spring tab member 50 to bend at the torsion spring and permits withdrawal of the wings 54 and 56 from the pockets 44 and 46. After being withdrawn from the pockets 44 and 46, the release member 50 tends to resume a flat planar position as shown in FIGS. 6 and 7. When the balloon is inflated, the top cap acts to keep the release member in the pockets of the fixed member and keep the closure closed (FIG. 5), whereas positive opening is assured by pulling on the operator release 30 (FIGS. 6 and 7).

Reinstallation of the top cap and reassembly of the closure is relatively simple and achieved by merely bending the releasable member 50 about the torsion spring 52 and inserting the wing members 54 and 56 into the pockets 44 and 46 of the fixed member 42.

This closure system exhibits a number of advantages including: (1) resistance to inadvertent opening; (2) quick and easy opening allowing for quick deflation; (3) reversibility in the event of partial opening to the extent that the flight can be continued; (4) ease of reinstallation; (5) low maintenance; and (6) redundancy of the maneuvering vent port and the deflation panel. It should be noted that either of these control systems (i.e., deflation panel and vent port) can substitute reasonably well for each other in the event of a failure.

In an alternative construction, the fixed member has a ring-like shape and the releasable member may be a resilient ball secured both to the securement member and the operator release. The ball is forced through the ring for closure and then pulled back through the ring for opening. When the deflation panel is closed, the top cap forces would keep the ball within the ring, but when the release is pulled, the forces would pull the ball through the ring so as to permit the deflation panel to be opened.

In another design, a flat plastic tab having rounded ends and bendable at the center was used rather than the spring tab member.

Although the invention has been described with respect to preferred embodiments, it is not to be so limited as changes and modifications can be made which are within the full intended scope of the invention as defined by the appended claims.

I claim as my invention:

1. A balloon which includes a balloon envelope having generally circular top opening and a top cap positioned within the envelope adjacent the top opening for closing said opening and constructed to separate from said envelope for deflating said balloon, and closure assembly means for use with the envelope and top cap for closing the top cap and permitting controlled opening thereof; said closure assembly having a fixed member secured to the envelope interior and a releasable member releasably secured to said fixed member and adapted to separate therefrom, securement means connecting the top cap and releasable member, and operator release means secured to said releasable member for separating said releasable member from said fixed member and cooperating in separating the top cap from the envelope for deflation, said securement means and top cap constructed to apply a substantially lateral closing force to the releasable member to maintain the connection between the fixed member and releasable member, and said operator release means constructed to apply substantially normal opening force to the releasable member for separating the release member from the fixed member.

2. A balloon as in claim 1, wherein said fixed member comprises a pocketlike structure defining an open portion and adapted to receive and retain the releasable member therein.

3. A balloon as in claim 2, wherein said fixed member defines a pair of pockets, spaced from each other and opening toward each other, and said releasable member comprises a spring tab member having a pair of wing members for positioning in said pockets and a central member for positioning between said pockets, said securement means and operator release means being secured to said central member, said release member being separable from said fixed member by withdrawing said wings from said pockets.

4. A balloon as in claim 3, wherein said securement means is adapted to apply a substantially lateral force to said releasable member to maintain at least one of the wing members in said pocket for maintaining the closure member closed, and said operator release means is adapted to apply a substantially normal force to said release member to withdraw the wing members from said pockets.

5. A balloon as in claim 3, wherein said release member is a wire-form member having a central torsion spring and a pair of U-shaped wing forming members extending therefrom and said securement means and release is secured to said central torsion spring.

6. A balloon as in claim 1, wherein there are provided a plurality of closure members arranged about the periphery of the balloon opening to permit separation of the top cap and balloon envelope along an arc of about 240°.

7. A balloon as in claim 6, wherein said closure members are provided in two sets with the release members in each set being interconnected for serial opening so that separation of a closure will result in a serial opening of an adjacent closure.

8. A balloon as in claim 1, further including vent means along a portion of said top cap and balloon envelope whereby separation of the top cap and envelope will result in controlled venting of the envelope for maneuvering.

9. A closure member for use with a balloon having a circular top opening and a top cap for controllably closing said top opening, said closure comprising a fixed member for securement to the balloon envelope and a releasable member for connection to a top cap:
said fixed member having pocket defining means for receiving the releasable member; and
said releasable member having at least one wing-like member to be received in said pocket defining means and to be held in said pocket defining means when forces are applied in a first direction and withdrawn from said pocket defining means when forces are applied in a second direction.

10. A closure as in claim 9, wherein said pocket defining member includes a pair of pockets, spaced from each other and opening toward each other and said releasable member comprises a spring tab having a pair of wing members for positioning in said pockets and a central torsion spring member to which the wing members are connected for positioning between the pocket, said wing member being bendable about said spring member.

11. A closure as in claim 10, wherein said first direction is substantially lateral to the fixed member for retaining the releasable member therein and said second direction is substantially normal to said fixed member and release member for withdrawing said wing members from said pockets.

* * * * *